(12) United States Patent
Ruhlander et al.

(10) Patent No.: US 8,113,085 B2
(45) Date of Patent: Feb. 14, 2012

(54) MULTI-PIECE CORE ADJUSTER WITH OPTIONAL CONFIGURATIONS

(75) Inventors: Gregory P. Ruhlander, Hannibal, MO (US); Donald G. Gordy, Moberly, MO (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 1127 days.

(21) Appl. No.: 11/683,729

(22) Filed: Mar. 8, 2007

(65) Prior Publication Data

US 2008/0217461 A1 Sep. 11, 2008

(51) Int. Cl.
  F16C 1/22 (2006.01)
  F16C 1/26 (2006.01)
  B60T 7/10 (2006.01)
  B64C 13/30 (2006.01)

(52) U.S. Cl. .................. 74/502.6; 74/501.5 R

(58) Field of Classification Search .............. 74/500.5, 74/501.5 R, 502.4, 502.5, 502.6
  See application file for complete search history.

(56) References Cited

U.S. PATENT DOCUMENTS

| | | | |
|---|---|---|---|
| 3,744,339 A | 7/1973 | Martinson | |
| 5,207,116 A * | 5/1993 | Sultze | 74/502.4 |
| 5,220,832 A * | 6/1993 | Petruccello | 74/502.4 |
| 5,394,770 A | 3/1995 | Boike et al. | |
| 5,398,566 A * | 3/1995 | Moore | 74/502.4 |
| 5,598,743 A * | 2/1997 | Yasuda | 74/502.4 |
| 6,619,439 B2 * | 9/2003 | Gibson | 188/2 D |
| 2003/0223805 A1 * | 12/2003 | Ruhlander | 403/122 |
| 2004/0037624 A1 | 2/2004 | Gordy et al. | |
| 2006/0039748 A1 | 2/2006 | Ruhlander | |
| 2008/0257099 A1 * | 10/2008 | Terrades et al. | 74/502.6 |
| 2009/0049947 A1 * | 2/2009 | Horinaka et al. | 74/502.4 |

FOREIGN PATENT DOCUMENTS

| | | |
|---|---|---|
| DE | 19731039 | 1/1999 |
| DE | 102004013193 | 10/2005 |
| WO | WO-2006050948 | 5/2006 |

\* cited by examiner

*Primary Examiner* — Justin Krause
(74) *Attorney, Agent, or Firm* — Gifford, Krass, Sprinkle, Anderson & Citkowski, P.C.; Kevin S. Mackenzie; Dean B. Watson

(57) ABSTRACT

A modular core adjuster for a cable assembly includes an adjuster body and a slider body arrangeable with the adjuster body to accommodate the cable in more than one configuration. The modular core adjuster includes a multi-piece adjuster body having a first body portion and a second separate body portion configured to be combined to define the adjuster body. A slider body is supported by the adjuster body for movement relative to the adjuster body wherein the slider body is arrangeable with the adjuster body to accommodate the cable in more than one configuration. A lock cavity is formed through an outer peripheral surface of the first and second body portions and a lock member is disposed in the lock cavity and is movable from a shipping position to a locked position.

18 Claims, 6 Drawing Sheets

MULTI-PIECE CORE ADJUSTER WITH OPTIONAL CONFIGURATIONS

FIELD OF THE INVENTION

The invention relates to core adjusters, and more particularly to multi-piece core adjusters.

BACKGROUND OF THE INVENTION

Core adjuster assemblies are commonly utilized in control cable assemblies used in motion transmitting push-pull applications. Such assemblies are widely used in automotive applications such as with control cables and other adjusting cables. The core adjuster assemblies compensate for variation in distances between mounting points by adjusting the length of the core element.

In order to facilitate installation of a cable assembly in a vehicle, it is important to adjust the length of the core wire so as to provide a precise core wire length. The various prior art adjusters have been disclosed to adjust a length of a control cable. However, the prior art does not include a core adjuster assembly having the ability to be arranged such that it may be utilized in more than one configuration. Additionally, prior art adjusters do not provide a core adjuster assembly with satisfactory dampening characteristics that avoid lash in a cable system. Further, prior art cable adjusters do not include a satisfactory mechanism for maintaining the adjuster in a pre-installed shipping position and in an installed lock position. Therefore, there is a need in the art for an improved adjuster that solves the limitations of the prior art.

SUMMARY OF THE INVENTION

In one aspect, there is disclosed a modular core adjuster for a cable assembly that includes an adjuster body and a slider body arrangeable with the adjuster body to accommodate the cable in more than one configuration.

In another aspect, there is disclosed a modular core adjuster for a cable assembly that includes a multi-piece adjuster body having a first body portion and a second separate body portion configured to be combined to define the adjuster body. A slider body is supported by the adjuster body for movement relative to the adjuster body wherein the slider body is arrangeable with the adjuster body to accommodate the cable in more than one configuration.

In another aspect, there is disclosed a modular core adjuster for a cable assembly that includes a multi-piece adjuster body having a first body portion and a second separate body portion configured to be combined to define the adjuster body. A lock cavity is formed through an outer peripheral surface of the first and second body portions and a lock member is disposed in the lock cavity and is movable from a shipping position to a locked position. A slider body is supported by the adjuster body for movement relative to the adjuster body wherein the slider body is arrangeable with the adjuster body to accommodate the cable in more than one configuration.

DETAILED DESCRIPTION OF THE PREFERRED EMBODIMENTS

Figure 1:
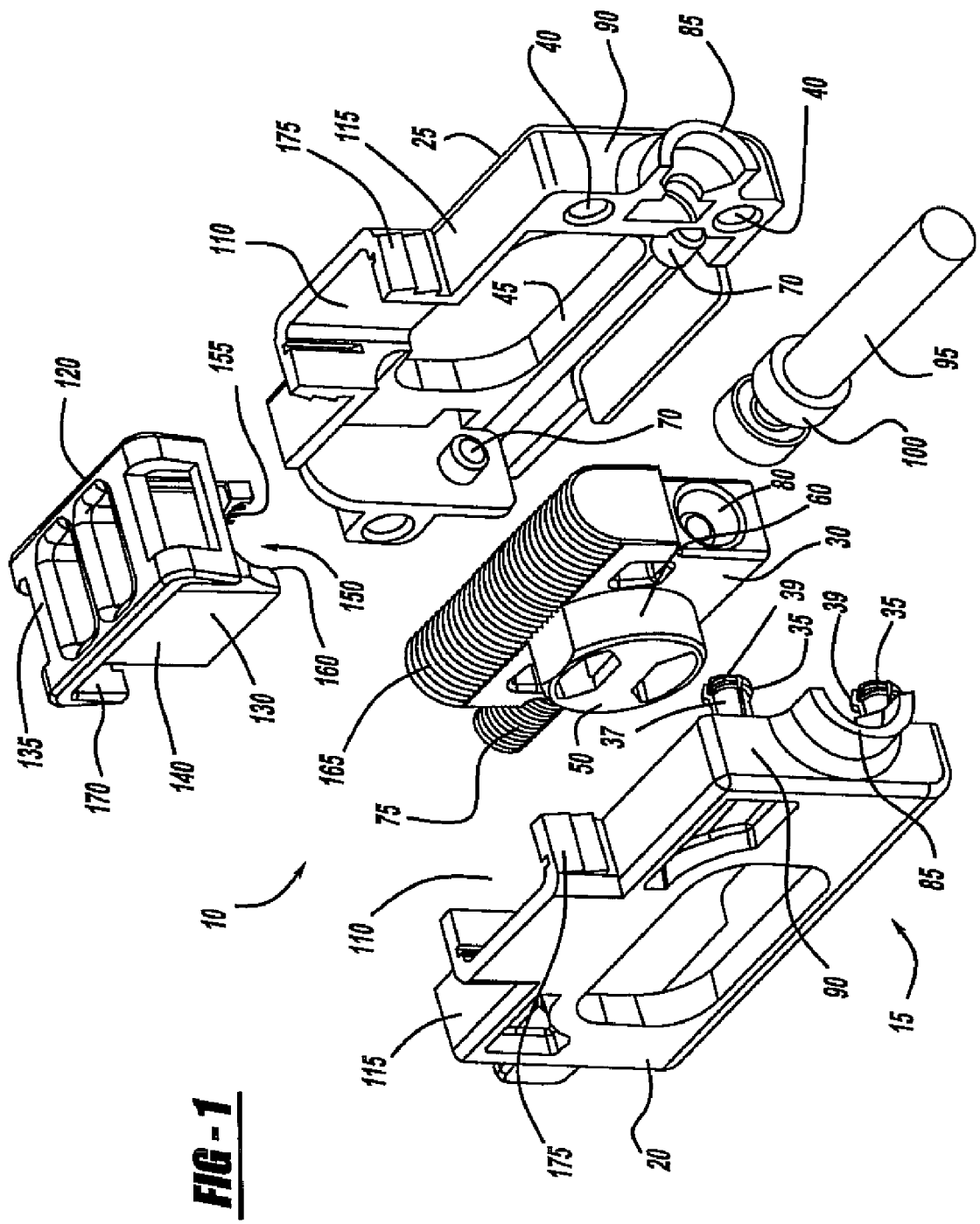
FIG. 1 is an exploded perspective view of a modular core adjuster.

Referring to FIG. 1, there is shown a modular core adjuster 10 for a cable assembly. The modular core adjuster 10 includes a multi-piece adjuster body 15 that may include a first body portion 20 and a second separate body portion 25 that is configured to be combined to define the adjuster body 15. The modular core adjuster 10 also includes a slider body 30 that is supported by the adjuster body 15 for movement relative to the adjuster body 15. The slider body 30 is arrangeable with the adjuster body 15 to accommodate the cable in more than one configuration, as will be discussed in more detail below.

In one aspect, the first and second body portions 20, 25 may include snap features 35 formed thereon for attaching the first and second body portions 20, 25 together. Various forms of snap features 35 may be utilized by the body portions. For example, snap features 35 having movable legs or compressible formations, Christmas tree type formations, J clips or other types of snap-together features may be utilized. As shown in FIG. 1, the snap features 35 may include posts 37 having compressible portions 39 that are inserted into slots 40 formed on an opposing body member such that the posts 37 are retained within the slots 40 joining the first and second body portions 20, 25 together.

Figure 2:
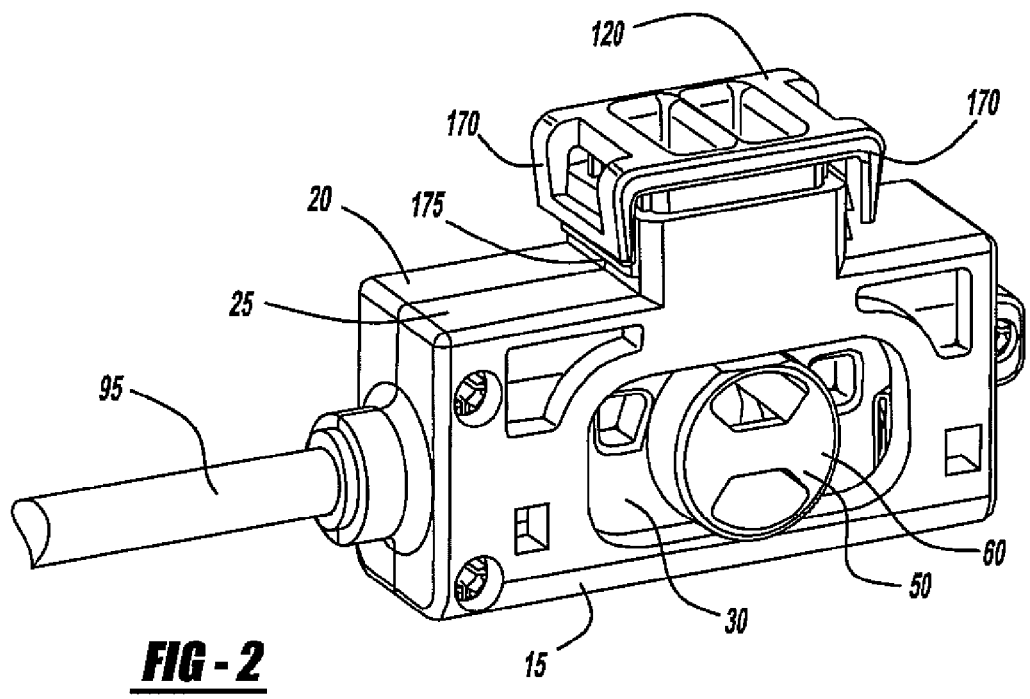
FIG. 2 is a perspective view of a modular core adjuster with one slider orientation.
Figure 3:
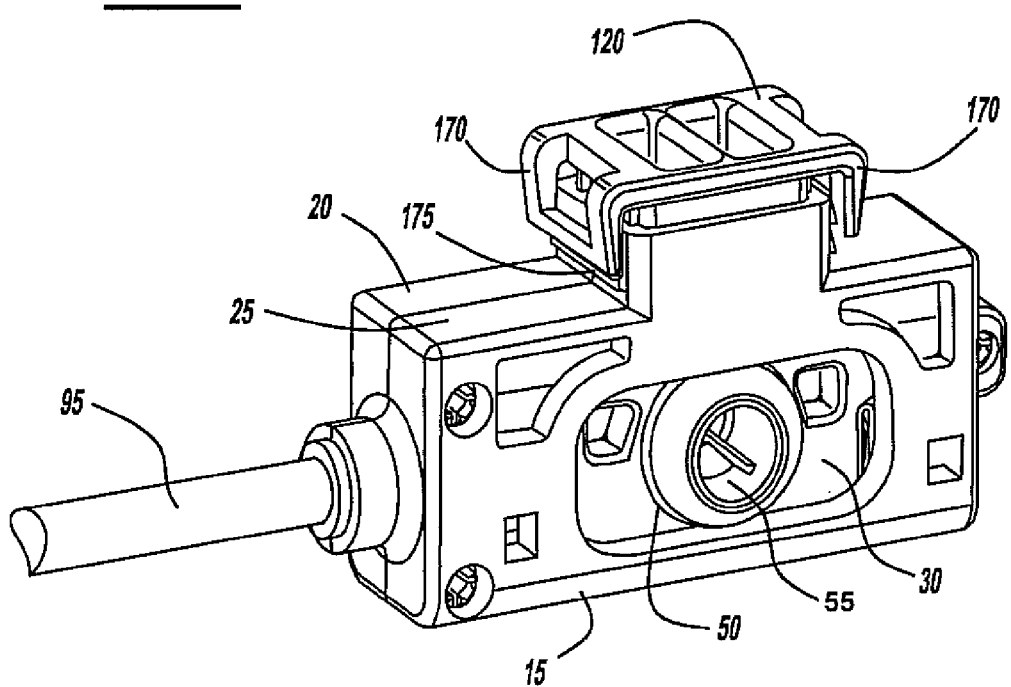
FIG. 3 is a perspective view of a modular core adjuster with the slider in an alternate orientation.

The first and second body portions 20, 25 may also include travel slots 45 formed therein. As shown in FIG. 1, the travel slots 45 may be formed in side surfaces 47 of the first and second body portions 20, 25. The travel slots 45 are adapted to receive opposing raised portions 50 formed on the slider body 30. In one aspect, one of the raised portions 50 includes a receptacle 55 formed therein for receiving a locking pin and an opposing raised portion 50 includes a stop 60 formed thereon. As best seen in FIGS. 2 and 3, the slider body 30 may be positioned within the adjuster body 15 in various orientations. As seen in FIG. 2, the slider body 30 may be positioned such that the raised portion 50 having a stop 60 formed thereon is positioned within a front travel slot 45 as shown in the figure. Alternatively, the raised portion 50 having a receptacle 55 formed therein for receiving a locking pin may be positioned in a front travel slot 45, as shown in FIG. 3. The alternate orientations of the raised portion 50 having the receptacle 55 and stop 60 allow for accommodating various cables that are positioned on alternate sides of the modular core adjuster 10.

Again referring to FIG. 1, the first and second body portions 20, 25 may include bottom sections 65 formed thereon that overlap and flex against each other when the first and second body portions 20, 25 are connected. The overlapping bottom sections 65 provide additional engagement between the first and second body portions 20, 25 in conjunction with the snap features 35 described above.

Figure 4:
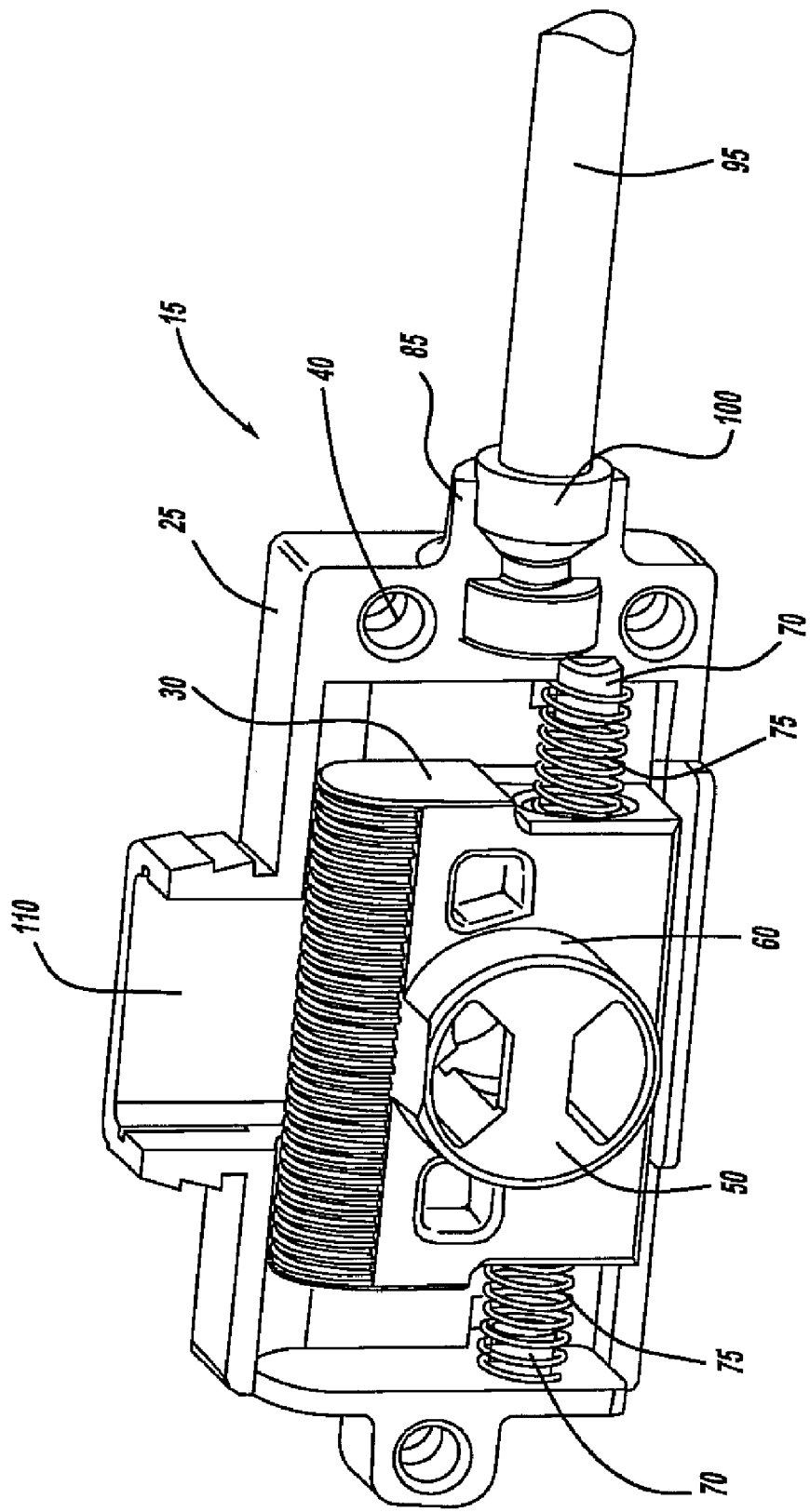
FIG. 4 is a cutaway perspective view detailing the slider body disposed within and supported by the adjuster body and including a biasing spring that may be positioned in alternate locations.

Referring to FIGS. 1 and 4, the first and second body portions 20, 25 may include guide posts 70 formed on opposing ends of the first and second body portions 20, 25. A biasing spring 75 may be disposed on one or both of the guide posts 70 for biasing the slider body 30 from the adjuster body 15. The slider body 30 may include opposing recesses 80 formed thereon for engaging the biasing spring 75. As shown in FIG. 4, the biasing spring 75 may be positioned on either side of the slider body 30 to provide a biasing direction that may be configured to move one way or another with respect to the adjuster body 15. In this manner, the biasing spring 75 may be utilized for biasing the slider body 30 in a desired direction. It should be realized that the spring 75, while shown on either end of the slider body 30 in FIG. 4, may be positioned on a single end or alternatively the springs 75 may be removed allowing the slider body 30 to move freely within the adjuster body 15 with no biasing force applied.

Figure 7:
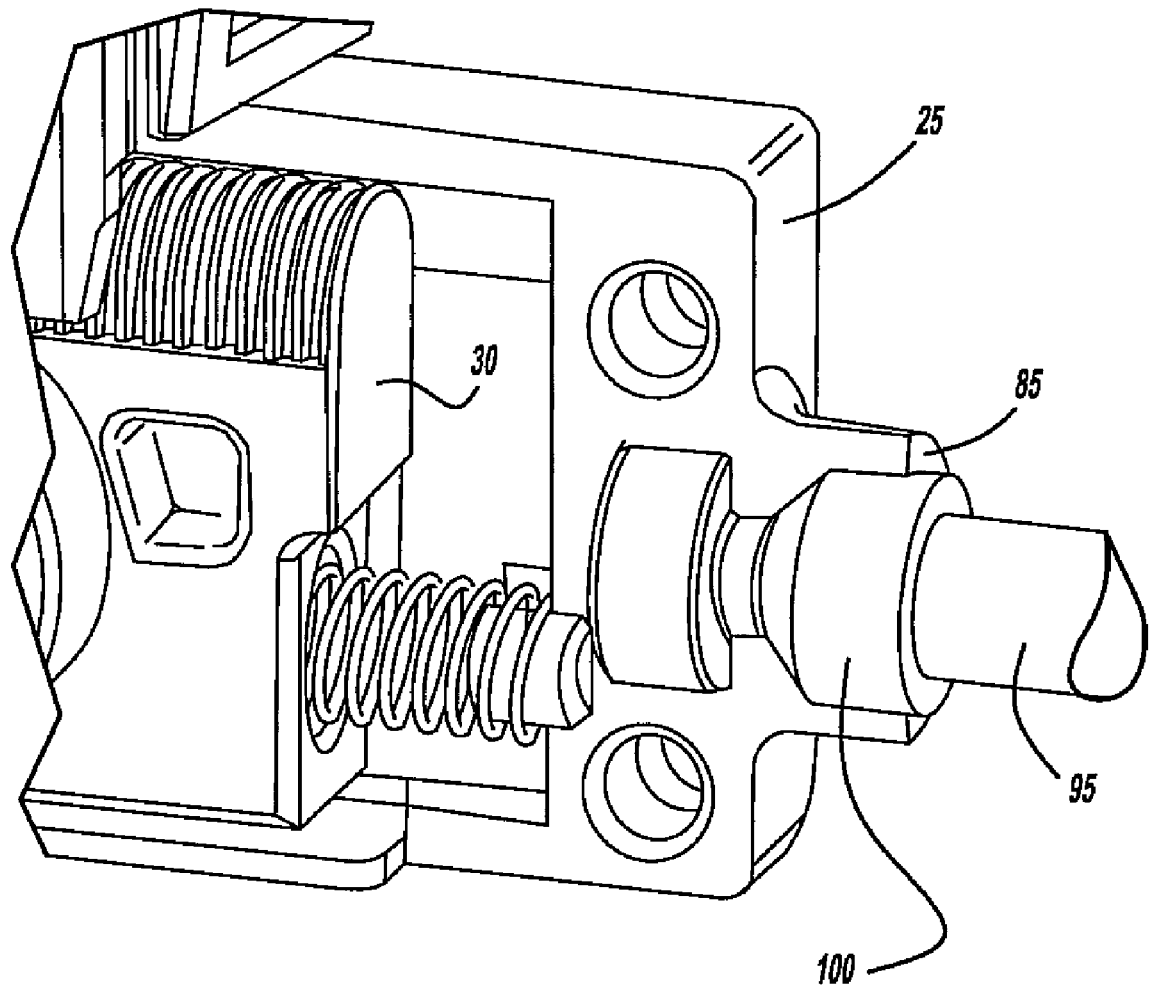
FIG. 7 is a partial perspective view of the modular core adjuster including a rod having an isolator material associated with the modular core adjuster.
Figure 8:
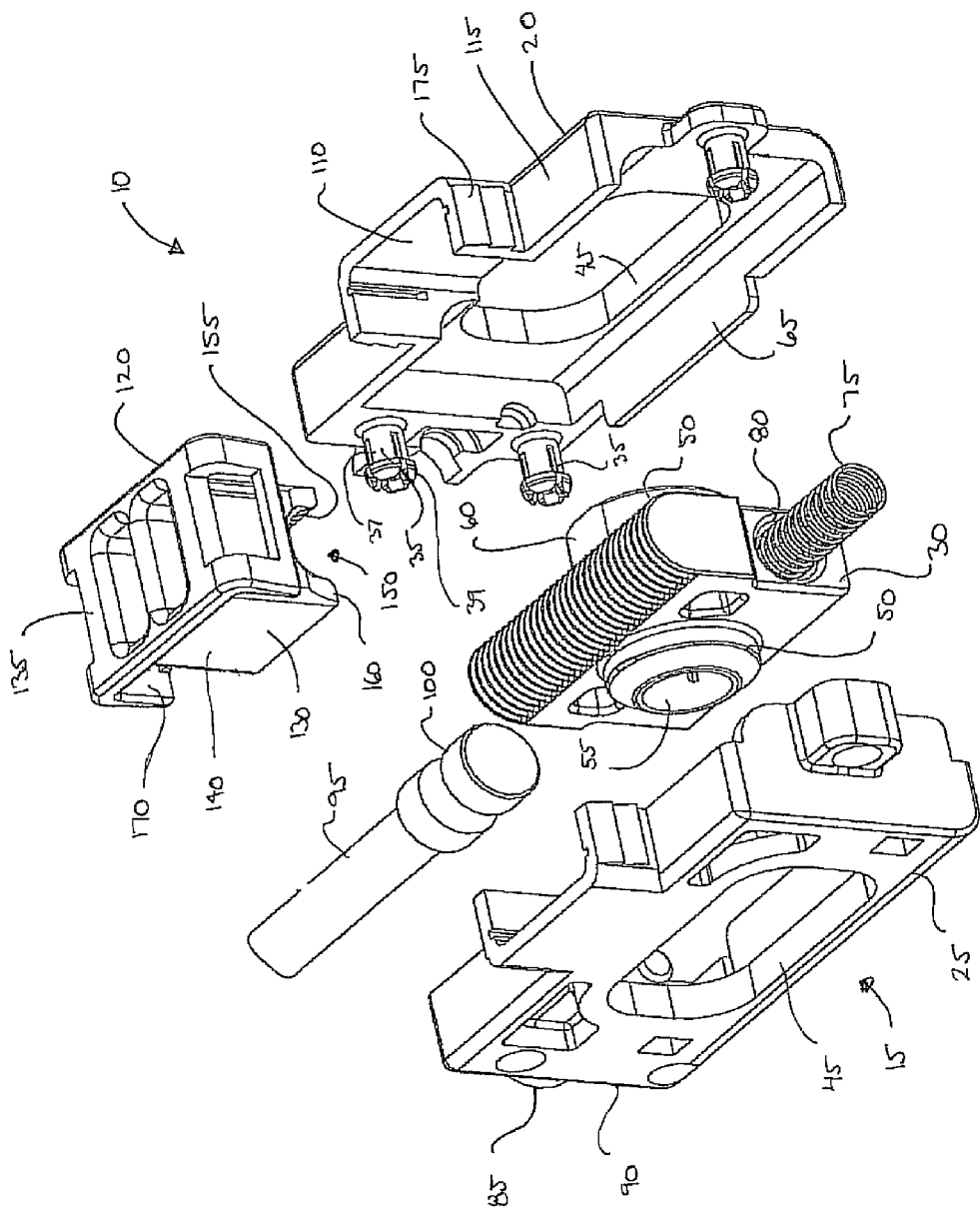
FIG. 8 is an exploded perspective view of a modular core adjuster.

Referring to FIG. 7, the first and second body portions 20, 25 may include pockets 85 formed on an outer end surface 90. The pockets 85 are adapted to retain a rod 95 of a cable assembly when the first and second body portions 20, 25 are connected. The rod 95 may include an isolator material 100 formed on an end of the rod 95 that is retained in the pockets 85. The isolator material 100 has a thickness sized to reduce lash associated with the core adjuster 10. The modular core adjuster 10 utilizes an isolator material 100 that differs from current prior art designs that utilize an isolator that is inserted into the slider directly and contacts an attachment pin once installed on a cable. Removing the isolation material from the slider attachment area allows for the raised portion 50 having the receptacle 55 to have better control over insertion loads with an attachment pin.

Figure 5:
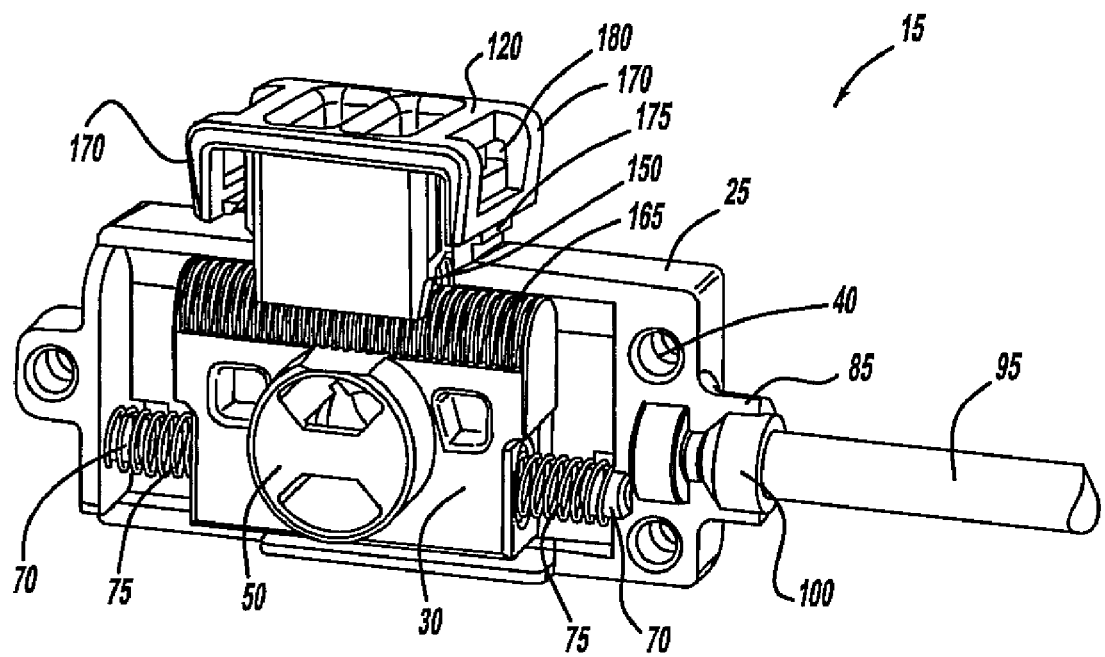
FIG. 5 is a cutaway perspective view of the modular core adjuster having the lock member in the shipping position.
Figure 6:
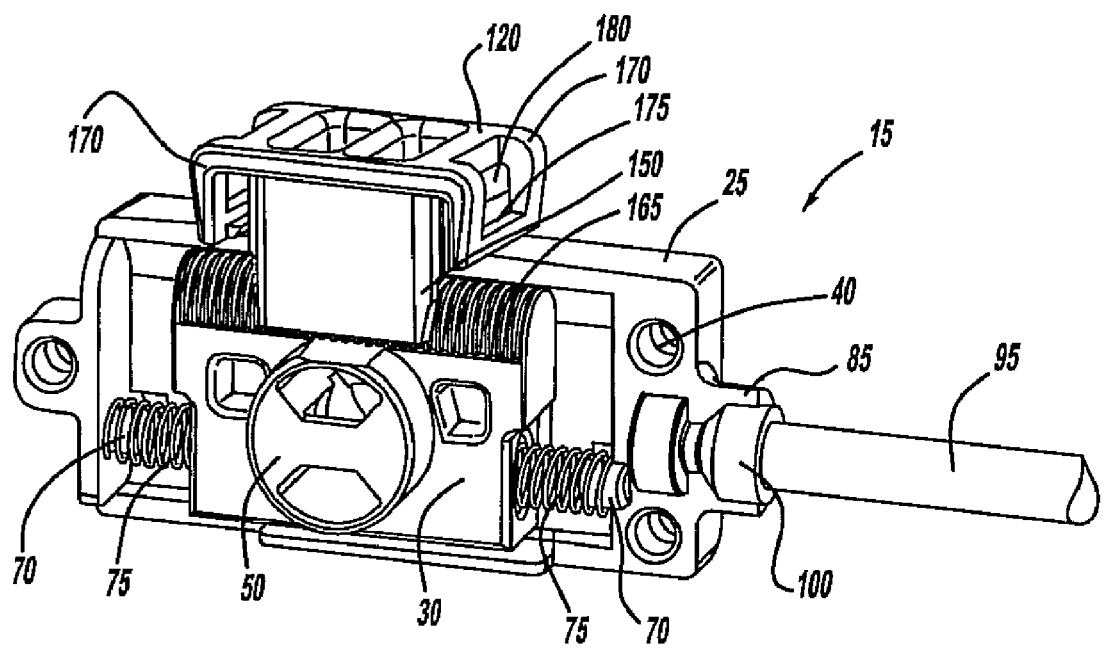
FIG. 6 is a cutaway perspective view of the modular core adjuster including a lock member disposed in the locked position.

Referring to FIGS. 5 and 6, the modular core adjuster 10 may include a lock cavity 110 formed through an outer peripheral surface 115 of the first and second body portions 20, 25. A lock member 120 is disposed in the lock cavity 110 and is movable from a shipping position shown in FIG. 5 to a locked position, shown in FIG. 6. The lock cavity 110 may include guide slots 125 for guiding the lock member 120 when moving within the lock cavity 110. The lock member 120 may include a rectangular shaped body 130 having top 135 and side 140 surfaces with an open bottom 145. The lock member 120 may also include a lock slot 150 including engagement teeth 155 formed on an inner surface 160 of the lock slot 150 for engaging corresponding teeth 165 formed on the slider body 30. The lock member 120 may also include snap prongs 170 formed thereon. The snap prongs 170 extend from the top surface 135 outwardly toward the side surfaces 140 and angle downward. The snap prongs 170 are adapted to engage notches 175 formed on the adjuster body 15. The snap prongs 170 may include an extraction assist feature 180 allowing the snap prongs 170 to be engaged and disengaged with the notches 175 formed on the adjuster body 15 allowing adjustment of the lock member 120 relative to the adjuster body 15.

In use, the modular core adjuster 10 may be assembled such that the slider body 30 is disposed between the first and second body portions 20, 25 that may be joined using snap features 35 thereby retaining and supporting the slider body 30 for movement relative to the adjuster body 15. As previously stated, the slider body 30 is arrangeable within the adjuster body 15 to accommodate the cable in more than one configuration. In this manner, the various raised portions 50 formed on the slider body 30 may be positioned within the travel slots 45 formed on the adjuster body 15 in a desired orientation to accommodate various cable assemblies. When disposed within the travel slots 45 formed in the first and second body portions 20, 25, the slider body 30 is guided by the raised portion 50 having the stop 60 limiting the overall movement of the slider body 30 within the adjuster body 15. As described above, a spring 75 may be disposed on either of the guide posts 70 formed on opposing ends of the first and second body portions 20, 25 to bias the slider body 30 in a desired direction or may be excluded from the modular core adjuster 10 allowing for free movement of the slider body 30 within the adjuster body 15.

As previously described above, a rod 95 having an isolator material 100 formed on an end is disposed within the pockets 85 formed on an outer end surface 90 of the first and second body portions 20, 25 to retain the rod 95 within the adjuster body 15. The isolator material 100 has a thickness sized to reduce lash associated with the core adjuster 10.

As described above, a lock cavity 110 formed through an outer peripheral surface 115 of the first and second body portions 20, 25 includes a lock member 120 that is movable between shipping and locked positions. When the lock member 120 is in the shipping position, the slider body 30 is free to move relative to the adjuster body 15. When the lock member 120 is positioned in the locked position, the slider body 30 is fixed relative to the adjuster body 15 maintaining a position of a cable connected to the modular core adjuster 10.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A modular core adjuster for a cable assembly comprising:
   a multi-piece adjuster body including a first body portion and a second separate body portion configured to be combined to define the adjuster body, the first and second body portions including travel slots formed therein; and
   a slider body that is separate and distinct from the adjuster body, the slider body including opposing raised portions formed thereon that are received in the travel slots, one of the raised portions including a stop formed thereon and an opposing portion including a receptacle, the receptacle being positionable on opposing sides relative to the adjuster body to accommodate a cable in more than one configuration.

2. The modular core adjuster of claim 1 wherein the first and second body portions include snap features formed thereon for attaching the first and second body portions together.

3. The modular core adjuster of claim 1 wherein either of the raised portions may be positioned in either of the travel slots.

4. The modular core adjuster of claim 1 wherein one of the first and second body portions includes guide posts formed on opposing ends of the first and second body portions.

5. The modular core adjuster of claim 4 including a biasing spring disposed on one of the guide posts for biasing the slider body from the adjuster body.

6. The modular core adjuster of claim 5 wherein the slider body includes opposing recesses formed thereon for engaging the biasing spring.

7. The modular core adjuster of claim 1 wherein the first and second body portions include bottom sections formed thereon that overlap and flex against each other when the first and second body portions are connected.

8. The modular core adjuster of claim 1 wherein the first and second body portions include pockets formed on an outer end surface, the pockets adapted to retain a rod of a cable assembly when the first and second body portions are connected.

9. The modular core adjuster of claim 8 wherein the rod includes an isolator material formed on an end of the rod retained in the pockets, the isolator material having a thickness sized to reduce lash associated with the core adjuster assembly.

10. The modular core adjuster of claim 1 including a lock cavity formed through an outer peripheral surface of the first and second body portions.

11. The modular core adjuster of claim 10 including a lock member disposed in the lock cavity, the lock member moveable from a shipping position to a locked position.

12. The modular core adjuster of claim 11 wherein the lock cavity includes guide slots for guiding the lock member in the lock cavity.

13. A modular core adjuster for a cable assembly comprising:
an adjuster body, the adjuster body including travel slots formed therein; and
a slider body including opposing raised portions formed thereon that are received in the travel slots, one of the raised portions including a stop formed thereon and an opposing portion including a receptacle, the receptacle being positionable on opposing sides relative to the adjuster body to accommodate a cable in more than one configuration.

14. The modular core adjuster of claim 13 wherein the adjuster body includes a first body portion and a second separate body portion configured to be combined to define the adjuster body.

15. The modular core adjuster of claim 14 wherein the first and second body portions include snap features formed thereon for attaching the first and second body portions together.

16. The modular core adjuster of claim 14 wherein the first and second body portions include travel slots formed therein and wherein the slider body includes opposing raised portions formed thereon that are received in the travel slots wherein one of the raised portions includes the receptacle formed therein and the opposing raised portion includes a stop formed thereon.

17. The modular core adjuster of claim 14 wherein one of the first and second body portions includes guide posts formed on opposing ends of the first and second body portions and a biasing spring disposed on one of the guide posts for biasing the slider body from the adjuster body.

18. A modular core adjuster for a cable assembly comprising:
a multi-piece adjuster body including a first body portion and a second separate body portion configured to be combined to define the adjuster body, the adjuster body including travel slots formed therein;
a lock cavity formed through an outer peripheral surface of the first and second body portions and a lock member disposed in the lock cavity, the lock member moveable from a shipping position to a locked position; and
a slider body supported by the adjuster body for movement relative to the adjuster body wherein the slider body including opposing raised portions formed thereon that are received in the travel slots, the opposing raised portions including a stop formed thereon and an opposing portion including a receptacle wherein the slider body, is arrangeable on opposing sides relative to the adjuster body to accommodate a cable in more than one configuration.

* * * * *